(12) United States Patent
Sela (10) Patent No.: US 12,233,421 B2
(45) Date of Patent: Feb. 25, 2025

(54) STORAGE SYSTEM FOR BIOLOGICAL SAMPLES IN FREEZING TANKS IN A LIQUID/GAS NITROGEN ENVIRONMENT

(71) Applicant: Roee Sela, Sal'it (IL)

(72) Inventor: Roee Sela, Sal'it (IL)

( * ) Notice: Subject to any disclaimer, the term of this patent is extended or adjusted under 35 U.S.C. 154(b) by 776 days.

(21) Appl. No.: 17/481,015

(22) Filed: Sep. 21, 2021

(65) Prior Publication Data

US 2022/0088592 A1   Mar. 24, 2022

Related U.S. Application Data

(60) Provisional application No. 63/080,940, filed on Sep. 21, 2020.

(51) Int. Cl.
| | | |
|---|---|---|
| *B01L 3/00* | (2006.01) | |
| *A01N 1/02* | (2006.01) | |
| *B01L 7/00* | (2006.01) | |
| *B01L 9/06* | (2006.01) | |

(52) U.S. Cl.
CPC ........ *B01L 3/50851* (2013.01); *A01N 1/0257* (2013.01); *A01N 1/0268* (2013.01); *B01L 7/50* (2013.01); *B01L 9/06* (2013.01); *B01L 2300/1894* (2013.01)

(58) Field of Classification Search
None
See application file for complete search history.

(56) References Cited

U.S. PATENT DOCUMENTS

| | | |
|---|---|---|
| 7,540,168 B2 | 6/2009 | Schumann |
| D615,450 S | 5/2010 | Cherem |
| 10,995,980 B2 | 5/2021 | James |
| 2006/0261060 A1 | 11/2006 | Baez |
| 2011/0120148 A1 | 5/2011 | Yoshimura |
| 2012/0293338 A1* | 11/2012 | Chaffey .................. G01K 1/024 340/870.02 |
| 2018/0306493 A1 | 10/2018 | James |
| 2019/0320650 A1* | 10/2019 | Johnson .................... B01L 7/50 |
| 2020/0107541 A1* | 4/2020 | Blair ..................... B01L 3/5082 |

* cited by examiner

*Primary Examiner* — Lore R Jarrett (57) ABSTRACT

The storage system is intended to provide users a device, that may securely hold biological samples within a cell in a space saving storage assembly. It is further an aim of the storage system to enable easy retrieval of the biological samples through a simple two-step retrieval action of the cell. Furthermore, the system includes a compact storage assembly that comprises multiple cells and canisters stacked together having efficient structural components that are suited for a typical freezer tank for biological samples. Additionally, the storage system comprises a simple elevator system that enables easy and fast retrieval of a single canister and cell from a large group of canisters.

17 Claims, 8 Drawing Sheets

STORAGE SYSTEM FOR BIOLOGICAL SAMPLES IN FREEZING TANKS IN A LIQUID/GAS NITROGEN ENVIRONMENT

The current application claims a priority to the U.S. Provisional Patent application Ser. No. 63/080,940 filed on Sep. 21, 2020.

FIELD OF THE INVENTION

The present invention relates generally to a space saving system for storing biological material in Nitrogen in a liquid/gaseous phase.

BACKGROUND OF THE INVENTION

In a world where the storage of biological samples increases rapidly, there is a growing use of more and more storage spaces, and a significant increase in use of expensive materials used for this purpose. The need for more efficient storage of biological samples has arisen. Stored biological samples are often expensive and sensitive material. Therefore, there is a need for a construction that will allow robust and safe storage for the material inside the freezing tanks, while allowing fast and easy access to the biological samples.

An objective of the present invention is to provide users with a storage system, that may securely hold biological samples within a cell in a space saving storage assembly. It is further an aim of the present invention to enable easy retrieval of the biological samples through a simple two-step retrieval action of the cell. Furthermore, the present invention comprises a compact storage system that comprises multiple cells and canisters stacked together that are suited for a typical freezer tank for biological samples. Additionally, the present invention comprises a simple elevator system that enables easy and fast retrieval of a single canister and cell from a large group of canisters.

DETAIL DESCRIPTIONS OF THE INVENTION

All illustrations of the drawings are for the purpose of describing selected versions of the present invention and are not intended to limit the scope of the present invention.

In reference to FIG. 1 through FIG. 8, the present invention is a storage system for biological samples. An objective of the present invention is to provide users with a storage system, that may securely hold biological samples within a cell in a space saving storage assembly. It is further an aim of the present invention to enable easy retrieval of the biological samples through a simple two-step retrieval action of the cell. Furthermore, the present invention comprises a compact storage system that comprises multiple cells and canisters stacked together, having efficient structural components that are suited for a typical freezer tank for biological samples. Additionally, the present invention comprises a simple elevator system that enables easy and fast retrieval of a single canister and cell from a large group of canisters.

Figure 1:
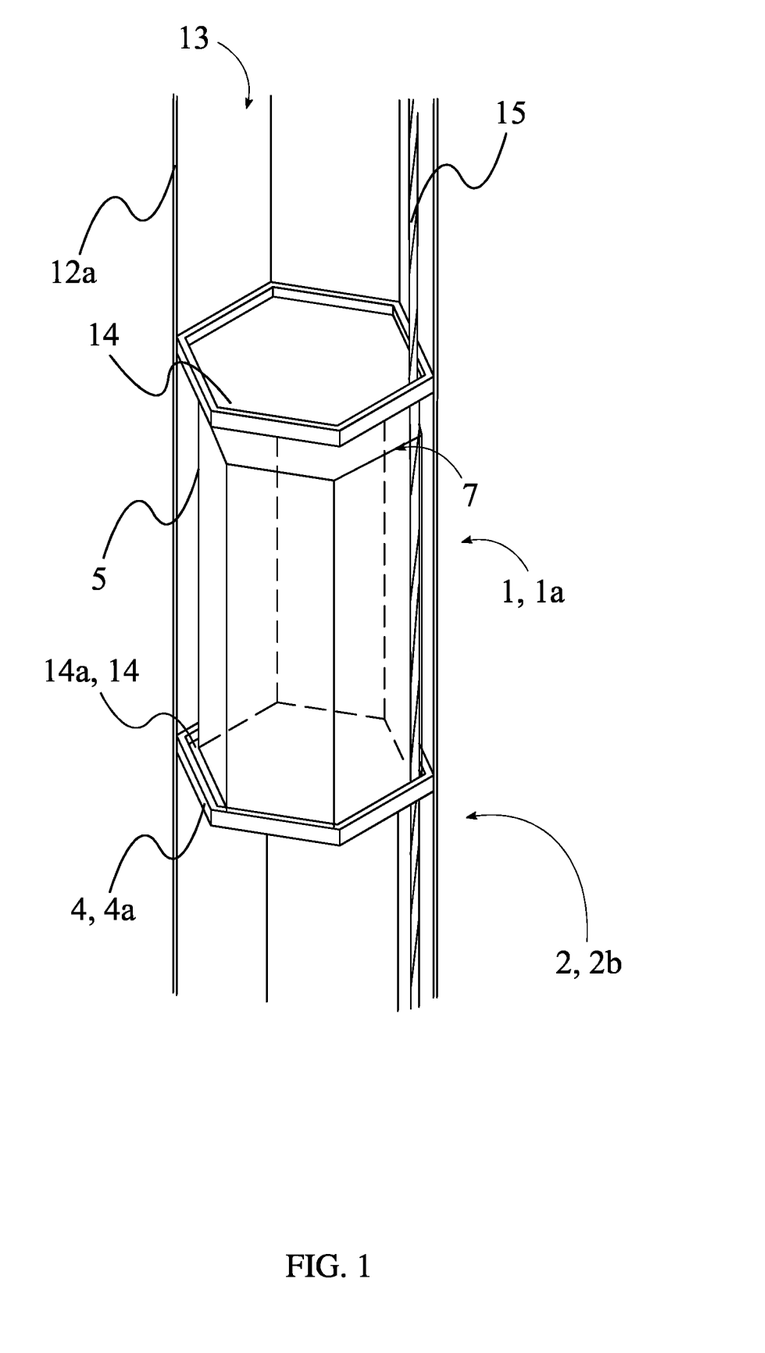
FIG. 1 is a top-front-right perspective view of a single cell within a sleeve in a closed configuration.
Figure 2:
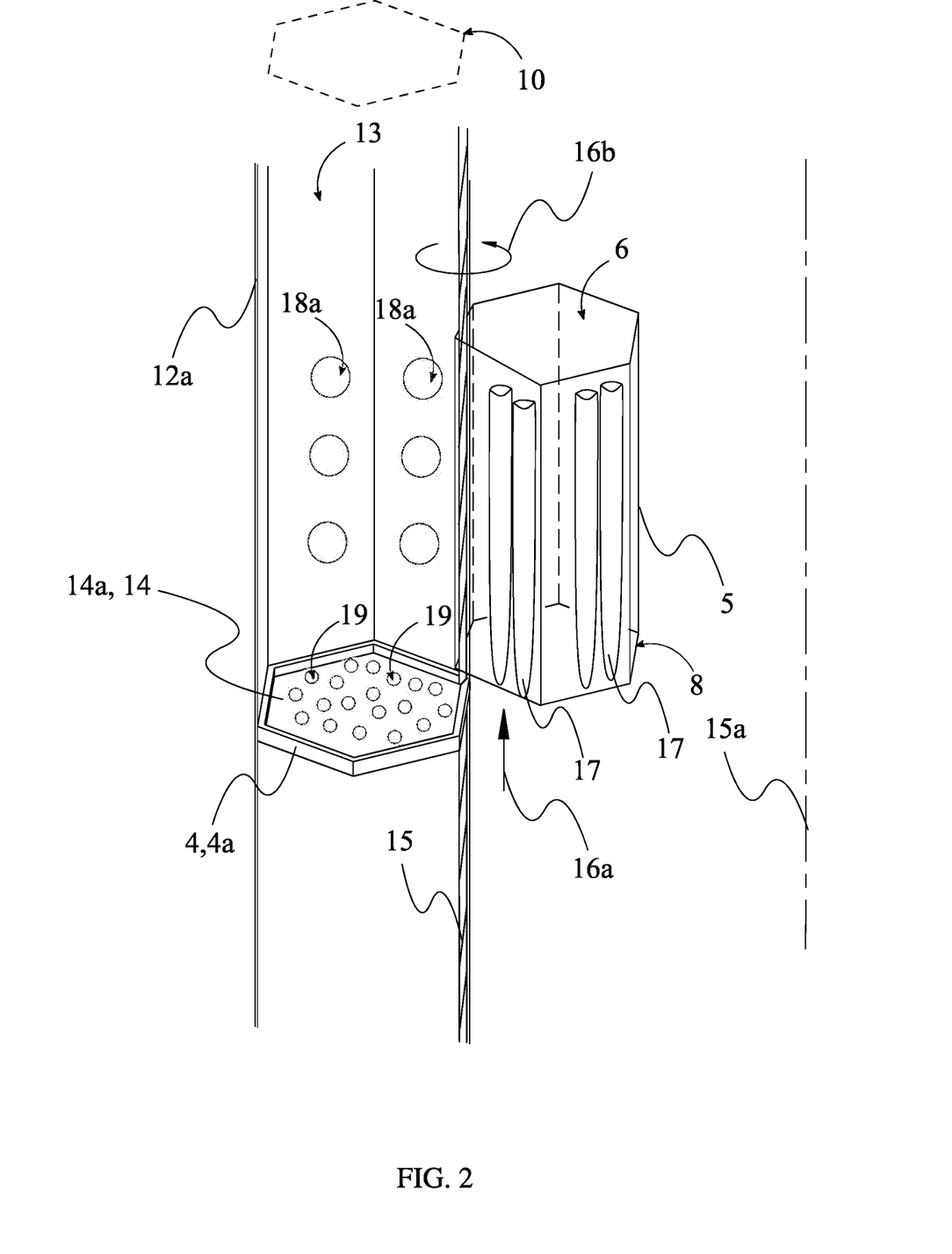
FIG. 2 is a top-front-right perspective view of a cell in open configuration.
Figure 3:
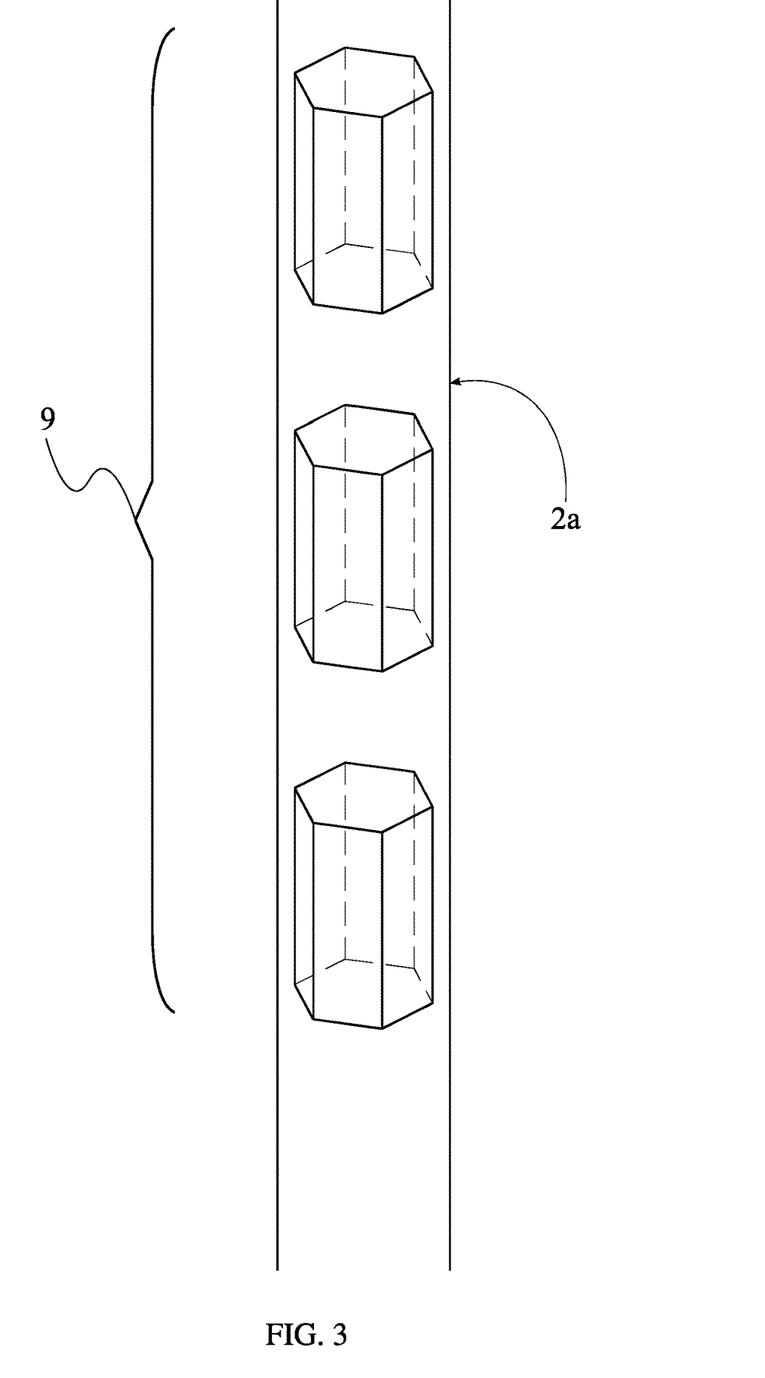
FIG. 3 is a top-front perspective view of a canister with three cells.
Figure 4:
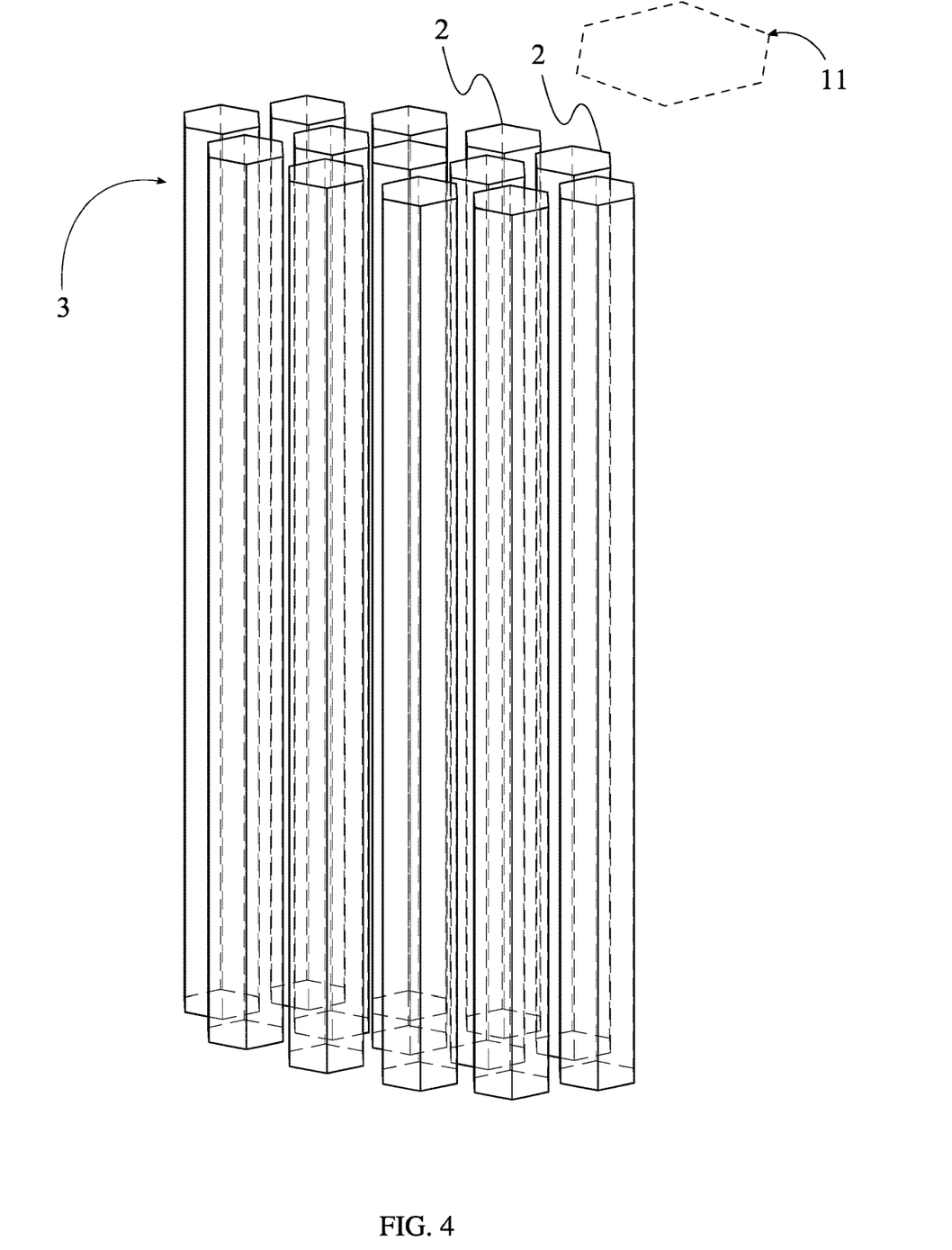
FIG. 4 is a top-front perspective view of a storage assembly.

The following description is in reference to FIG. 1 through FIG. 8. According to a preferred embodiment, the present invention comprises a plurality of cells 1, a plurality of canisters 2, a storage assembly 3, and a locking system 4. As seen in FIG. 1 and FIG. 2, each of the plurality of cells 1 comprises a receptacle 5 and an inner compartment 6, wherein the inner compartment 6 traverses into the receptacle 5. Preferably, the receptacle 5 is a longitudinal and sturdy solid structure. More specifically, the inner compartment 6 traverses from a first end 7 of the receptacle 5 towards a second end 8 of the receptacle 5, wherein the first end 7 is positioned opposite to the second end 8 across the receptacle 5. Thus, the receptacle 5 forms the structural base of an individual storing unit, and the inner compartment 6 may house the biological samples. Further, each of the plurality of canisters 2 may house a number of cells for in a space saving fashion. To that end, a first set of cells 9 is longitudinally mounted within a corresponding canister 2a, wherein the first set of cells 9 are from the plurality of cells 1, and the corresponding canister 2a is from the plurality of canisters 2. In reference to FIG. 3, the first set of cells 9 comprises three cells that are longitudinally mounted within the corresponding canister 2a. The longitudinal mounting is so that, the entire height of a freezer tank is utilized. However, the first set of cells 9 may comprise any other number, size, shape etc., as long as the intents of the present invention are not altered. In order to maximize the use of the tank's internal round structure, each of the plurality of cells 1 and each of the plurality of canisters 2 are polygonal in shape. Preferably, a first transversal cross section 10 of each of the plurality of cells 1 is hexagonal and a second transversal cross section 11 of each of the plurality of canisters 2 is hexagonal, as seen in FIG. 2 and FIG. 4. However, the plurality of cells 1 and the plurality of canisters 2 may comprise any other size, material, orientation, components and arrangement of components that are known to one of ordinary skill in the art, as long as the intents of the present invention are not altered.

In order to securely hold the plurality of cells 1 within the corresponding canister 2a and prevent any sliding of the plurality of the cells 1 within the corresponding canister 2a, the locking system 4 is integrated between each of the plurality of cells 1 and the corresponding canister 2a. Preferably, the locking system 4 is a simple wall or ledge, that would release each of the plurality of cells 1 with a two-step motion, wherein one motion is followed after the other. However, the locking system 4 may comprise any other locking mechanism that are known to one of ordinary skill in the art, as long as the objectives of the present invention are fulfilled.

Figure 5:
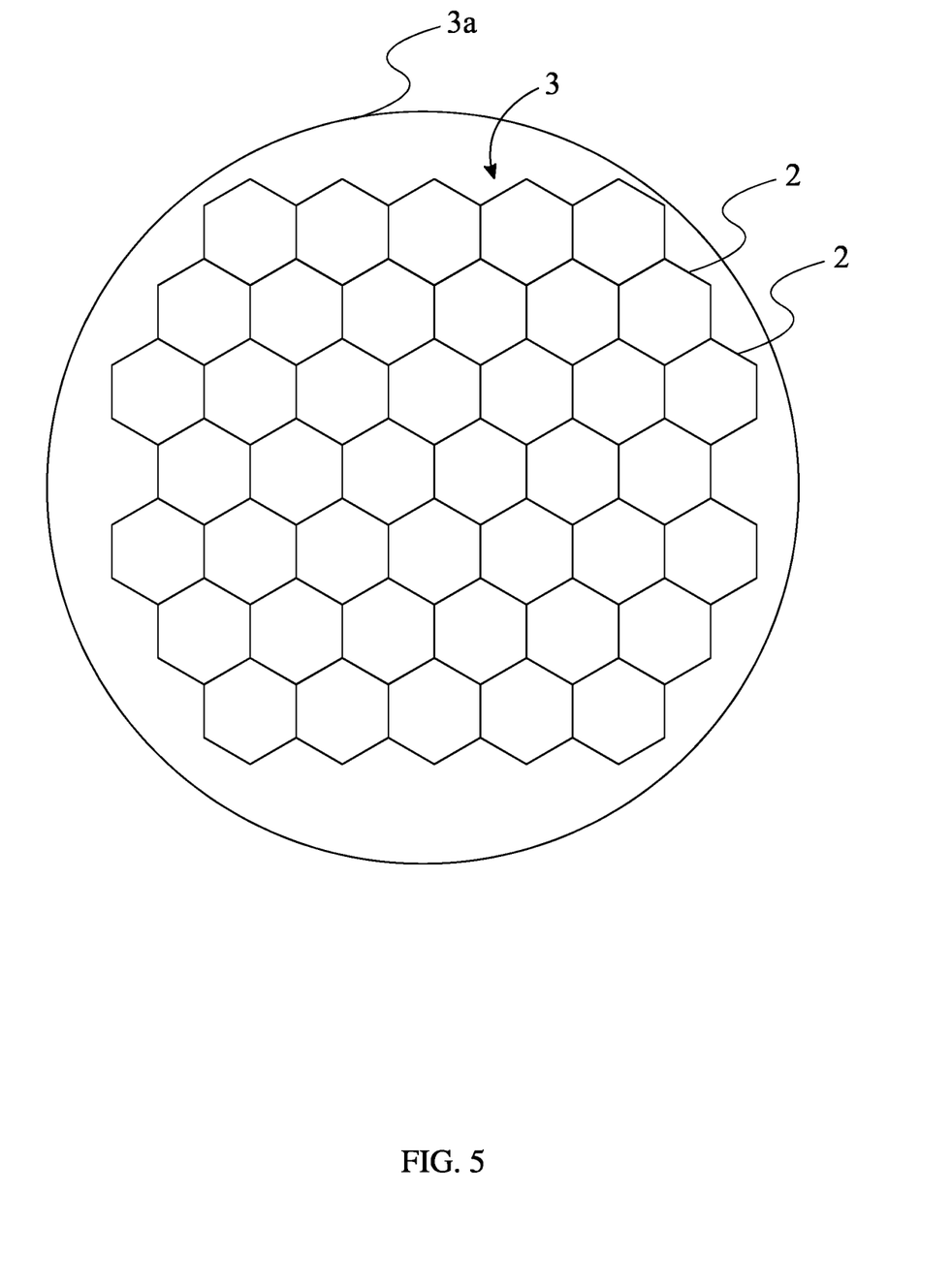
FIG. 5 is a top plan view of the storage assembly.

It is an aim of the present invention to store a plurality of biological samples in a space saving manner. To accomplish this, the plurality of canisters 2 is compactly arranged to form the storage assembly 3, such that adjacent walls of neighboring canisters are pressed against each other. It is further preferred that the storage assembly 3 comprises the plurality of canisters 2 being longitudinally and laterally stacked adjacent to each other. More specifically, as seen in FIG. 4, the longitude shape of the storage assembly 3 is achieved, by placing several cells and several canisters, one on top of the other, creating a multi-story structure. Furthermore, as seen in FIG. 5, a "honeycomb" like construction is achieved for the storage assembly 3, by placing canisters alongside one another. In other words, the storage assembly 3 comprises a honeycomb pattern. This is so that maximum space is conserved both vertically and horizontally within a freezer tank 3a and more biological samples may be stored within a single freezer tank 3a.

A more detailed description of the components of the present invention follows. According to the preferred embodiment, each of the plurality of canisters 2 comprises a sleeve 12, an inner cavity 13, a plurality of mounting bases 14 and a pole 15. Preferably, the inner cavity 13 traverses into the sleeve 12, such that the plurality of cells 1 may be housed within the inner cavity 13. Further, the sleeve 12 partially and perimetrically encompasses the plurality of mounting bases 14 and the plurality of mounting bases 14 is longitudinally arranged along the sleeve 12. This is so that, the partial covering of the sleeve 12 provides the necessary separation, covering and protection for each of the plurality of cells 1, and yet each of the plurality of cells 1 may be easily accessed through the uncovered portion of the sleeve 12. Further, as seen in FIG. 1, the plurality of mounting bases 14 is laterally mounted within the inner cavity 13 and normal to the sleeve 12. The plurality of mounting bases 14 acts as a separating platform and a resting base for each of the plurality of cells 1 within the sleeve 12. Furthermore, the pole 15 is mounted along a longitudinal axis 15a of each of the plurality of canisters adjacent the sleeve 12. In other words, the pole 15 forms a stable structural element for each of the plurality of canisters 2.

Continuing with the preferred embodiment, and as seen in FIG. 2, each of the plurality of cells 1 is rotatably mounted along the pole 15 of the corresponding canister 2a. The rotation motion pulls out each of the plurality of cells 1 out of the corresponding sleeve 12a so as to open or expose the inner compartment 6 of each cell 1. To accomplish this, each of the plurality of cells is threaded through the pole 15. Further, each of the cell 1 may be rotated again in a counter direction and slid into the inner cavity 13 for safe storage. Furthermore, each of the plurality of cells 1 is mounted within the inner cavity 13 adjacent a corresponding base 14a during a closed configuration, wherein the corresponding base 14a is from the plurality of mounting bases 14. In other words, the plurality of mounting bases 14 acts as a resting platform, safety margin, and separator between each of the plurality of cells 1 within a corresponding canister 2a. Thus, the pole traverses through the plurality of mounting bases 14 as well.

In reference to FIG. 2, the locking system 4 is integrated between each of the plurality of cells 1 and the corresponding canister 2a. Operating the locking system 4 enables secure storage as well as access to the contents of each of the plurality of cells 1. Further, when inside the inner cavity 13, each of the plurality of cells is pressed against a corresponding base 14a, wherein the corresponding base 14a is from the plurality of mounting bases 14. Accordingly, wherein the locking system 4 is in a locked configuration, each of the plurality of cells 1 is positioned within the sleeve 12 in between each of the plurality of mounting bases 14. In other words, when in the locked position, each of the plurality of cells 1 are securely locked and stably positioned within the sleeve 12 of the corresponding canister 2a.

In the preferred embodiment, each of the plurality of cells 1 may be opened individually. Due to the locking system 4 and the safety margins of each of the plurality of canisters 2, or the plurality of mounting bases 14, each cell cannot be opened by a simple tilt. To that end, according to the preferred embodiment, the locking system comprises a surrounding wall 4a. As seen in FIG. 1 and FIG. 2, the surrounding wall 4a is mounted perimetrically around each of the plurality of mounting bases. Accordingly, the surrounding wall 4a encompasses the second end 8 of each of the plurality of cells 1, during the closed configuration. Preferably, the surrounding wall 4a spans a few millimeters in length and extends normally from the plurality of mounting bases 14. However, it should be noted that, the locking system 4 may comprise any other size, shape, mechanism etc. that are known to one of ordinary skill in the art, as long as the intents of the present invention are not altered. Thus, wherein the locking system 4 is the surrounding wall, retrieving contents of a first cell 1a comprises a two-step motion. More specifically, a first motion 16a comprises pulling up the first cell 1a within the inner cavity 13 and raising the first cell 1a above the surrounding wall 4a. Subsequently, a second motion 16b comprises rotation, wherein the first cell 1a is rotated along the pole 15, out of the sleeve 12 to expose the contents within the inner compartment 13 of the first cell 1a. Thus, the present invention allows samples to be held safely when retrieving any canister from the storage assembly 3, while allowing fast opening of the cell as needed.

Continuing with the preferred embodiment, a method of storing of biological samples within the storage assembly comprises the following steps. For example, consider that a first cell 1a, wherein the first cell is from the plurality of cells, a first sleeve 12a, a first canister 2b, wherein the first canister is from the plurality of canisters and a plurality of biological samples 17 are involved in the storing process. Preferably, the first cell 1a is mounted within a first sleeve 12a of the first canister 2b, wherein the first canister 2b comprises the first sleeve 12a. Accordingly, the method firstly comprises, the locking system 4 between the first cell 1a and the first canister 2b being unlocked. Further, the inner compartment 13 of the first cell 1a is exposed by rotating the first cell 1a out of the first sleeve 12a. Subsequently, the plurality of biological samples 17 is placed within the inner compartment 13 of the first cell 1a. Following that, the first cell 1a is rotatably slid into the inner cavity 13 of the first canister 2b followed by locking of the locking system 4. Furthermore, the first canister 2b is placed adjacent the plurality of canisters 2 to complete the storage assembly 3.

Figure 6:
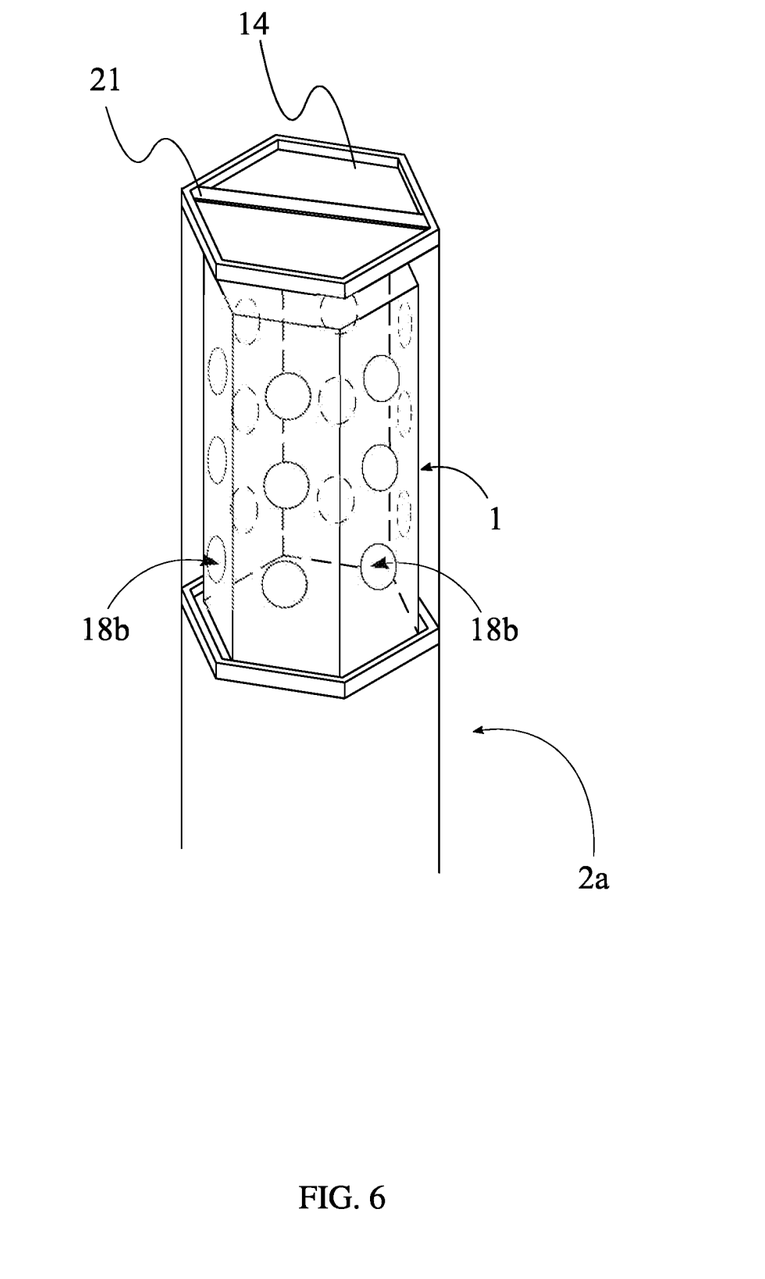
FIG. 6 is a top-front perspective view of a cell with a plurality of air holes.
Figure 7:
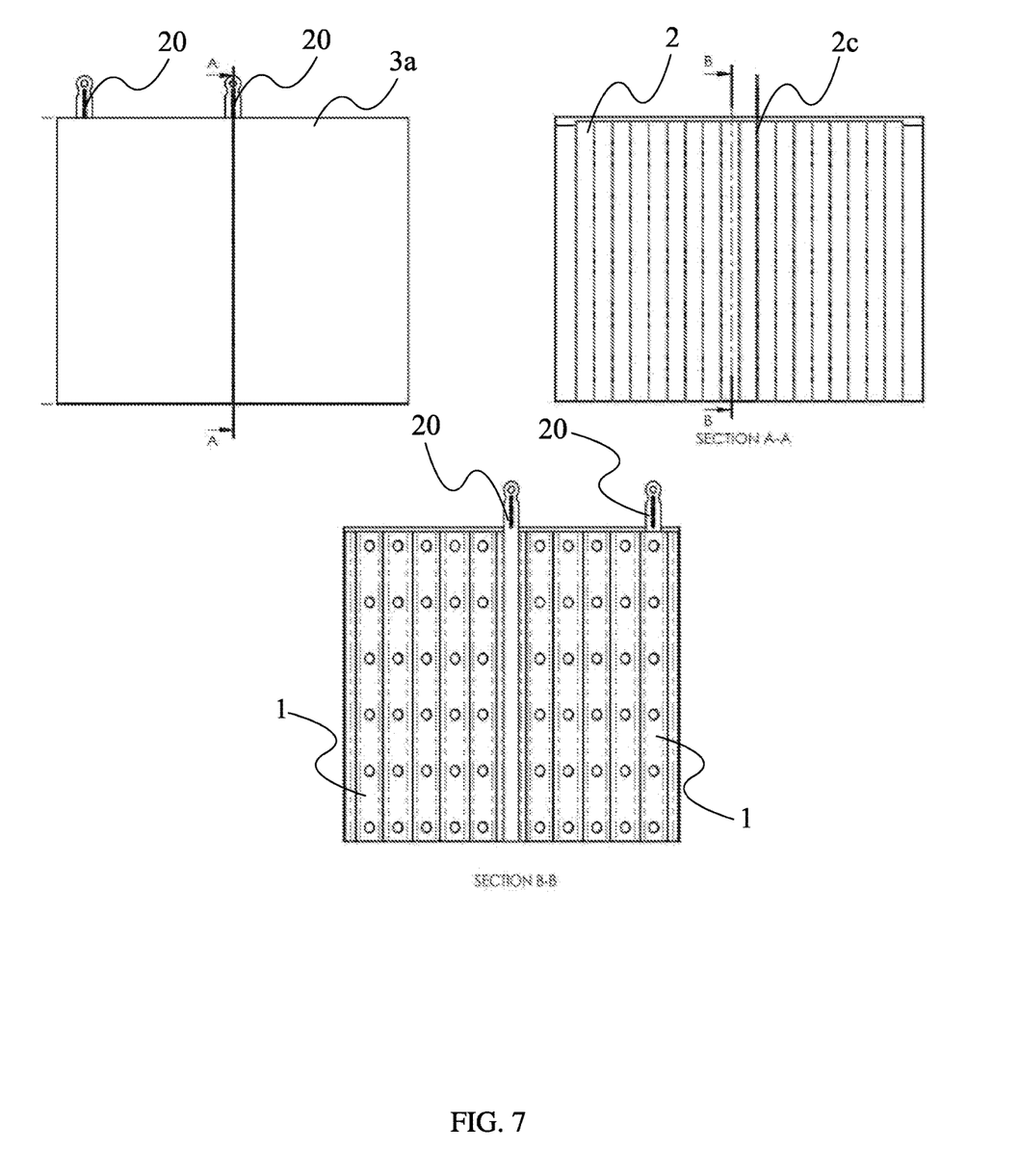
FIG. 7 is a front elevational view of a freezer tank and two sectional views of the freezer tank taken along A-A' and B-B'.

In order to ensure that the biological samples are maintained at the right temperature, and liquid nitrogen reaches to every cell within every canister, the present invention comprises a first plurality of air holes 18a, a second plurality of air holes 18b, and a third plurality of air holes 19. Preferably, the first plurality of air holes 18a laterally traverses into the sleeve 12, the second plurality of air holes 18b laterally traverses the each of the plurality of cells 1, and the third plurality of air holes 19 normally traverse into the plurality of mounting bases 14. As seen in FIG. 2, FIG. 6 and FIG. 7, the first plurality of air holes 18a, the second plurality of air holes 18b, and the third plurality of air holes 19 are circular. However, the air holes may comprise any other size, shape, orientation etc., as long as the intents of the present invention are not altered.

Figure 8:
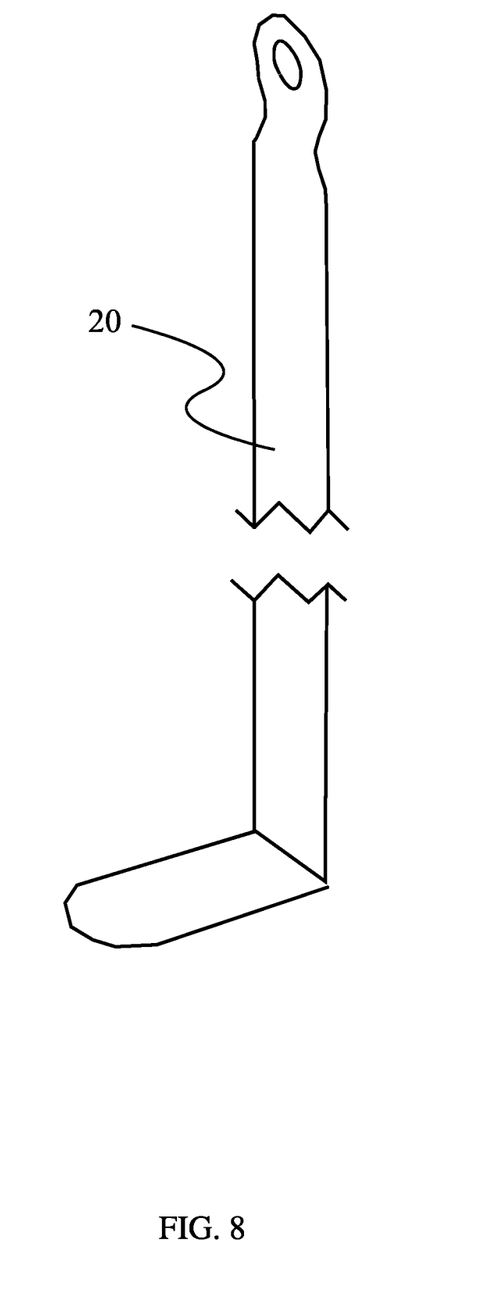
FIG. 8 is a top-front perspective view of an elevator system according to the present invention.

In order to efficiently retrieve each of the plurality of canisters from the storage assembly 3, the present invention further comprises an elevator system 20. Preferably, the elevator system 20 is positioned between a lateral sidewall and a terminal surface of a corresponding canister 2c, wherein the corresponding canister 2c is from the plurality of canisters 2. Further, the elevator system 20 is operably coupled with the corresponding canister 2c, such that operating the elevator system 20 enables retrieving the corresponding canister 2c from the plurality of canisters 2 in the storage assembly 3. As seen in FIG. 8, the elevator system 20 is an L-shaped lever. However, the elevator system 20 may comprise, any other size, shape, and elevation technology that are known to one of ordinary skill in the art, as long as the intents of the present invention are not altered.

Continuing with the preferred embodiment, the present invention comprises a latching rod 21. As seen in FIG. 6, the latching rod 21 is mounted adjacent a terminal end of each of the plurality of canisters 2. Preferably, the terminal end constitutes an upper end of the plurality of canisters 2 facing a user. This is so that the user may easily access and retrieve a specific canister from the storage assembly 3 by holding onto the latching rod 21 with either the elevator system 20 or any other appropriate tools. Further, the latching rod 21 is mounted within the inner cavity 13 connecting opposing sidewalls of each of the plurality of canisters 2.

Although the invention has been explained in relation to its preferred embodiment, it is to be understood that many other possible modifications and variations can be made without departing from the spirit and scope of the invention as hereinafter claimed.

What is claimed is:

1. A storage system for storing biological samples in freezer tanks, the system comprising:
    a plurality of cells;
    a plurality of canisters;
    a storage assembly;
    a locking system;
    each of the plurality of cells comprising a receptacle and an inner compartment;
    the inner compartment traversing into the receptacle;
    the inner compartment traversing from a first end of the receptacle towards a second end of the receptacle, wherein the first end is positioned opposite to the second end across the receptacle;
    each of the plurality of cells and each of the plurality of canisters being polygonal;
    a first set of cells being longitudinally mounted within a corresponding canister, wherein the first set of cells are from the plurality of cells, and the corresponding canister is from the plurality of canisters;
    the locking system being integrated between each of the plurality of cells and the corresponding canister;
    the plurality of canisters being compactly arranged to form the storage assembly, such that the plurality of canisters are pressed against each other.

2. The storage system of claim 1, wherein each of the plurality of canisters comprising:
    a sleeve;
    an inner cavity;
    a plurality of mounting bases;
    a pole;
    the inner cavity traversing into the sleeve;
    the sleeve partially and perimetrically encompassing the plurality of mounting bases;
    the plurality of mounting bases being longitudinally arranged along the sleeve;
    the plurality of mounting bases being laterally mounted within the inner cavity and normal to the sleeve; and
    the pole being mounted along a longitudinal axis of each of the plurality of canisters;
    each of the plurality of cells being rotatably mounted along the pole; and
    each of the plurality of cells being threaded through the pole.

3. The storage system of claim 2, comprising:
    wherein the plurality of cells being in a closed configuration;
    each of the plurality of cells being mounted within the inner cavity adjacent a corresponding base, wherein the corresponding base is from the plurality of mounting bases; and
    each of the plurality of cells being pressed on a corresponding base, wherein the corresponding base is from the plurality of mounting bases.

4. The storage system of claim 2, comprising:
    wherein the locking system being in a locked configuration:
    each of the plurality of cells being positioned within the sleeve; and
    each of the plurality of cells being pressed on a corresponding base, wherein the corresponding base is from the plurality of mounting bases.

5. The storage system of claim 2, the locking system comprising:
    a surrounding wall;
    the surrounding wall being mounted perimetrically around each of the plurality of mounting bases; and
    the surrounding wall encompassing the second end of each of the plurality of cells.

6. The storage system of claim 2, comprising:
    a first plurality of air holes;
    a second plurality of air holes;
    a third plurality of air holes;
    the first plurality of air holes laterally traversing into the sleeve;
    the second plurality of air holes laterally traversing into the plurality of cells; and
    the third plurality of air holes normally traversing through the plurality of bases.

7. The storage system of claim 1, comprising:
    a first transversal cross section of each of the plurality of cells being hexagonal; and
    a second transversal cross section of each of the plurality of canisters being hexagonal.

8. The system of claim 1, wherein the storage assembly comprising:
    the plurality of canisters being laterally pressed together; and
    the plurality of cells being longitudinally stacked.

9. The system of claim 1, comprising:
    an elevator system;
    the elevator system being positioned between a lateral sidewall of a corresponding canister and a terminal surface of the corresponding canister, wherein the corresponding canister is from the plurality of canisters;
    the elevator system being operably coupled with the corresponding canister, such that operating the elevator system enables retrieving the corresponding canister from the plurality of canisters in the storage assembly.

10. The system of claim 1, wherein the storage assembly being a honeycomb pattern.

11. The system of claim 10, wherein the elevator system being an L-shaped lever.

12. The system of claim 1, wherein each of the plurality of canisters comprising:
   a latching rod;
   the latching rod being mounted adjacent a terminal end of each of the plurality of canisters;
   the latching rod being mounted within the inner cavity connecting opposing sidewalls of each of the plurality of canisters.

13. A storage system for storing biological samples in freezer tanks, the system comprising:
   a plurality of cells;
   a plurality of canisters;
   a storage assembly;
   a locking system;
   each of the plurality of cells comprising a receptacle and an inner compartment;
   each of the plurality of canisters comprising a sleeve, an inner cavity, a plurality of mounting bases, and a pole;
   the inner compartment traversing into the receptacle;
   the inner cavity traversing into the sleeve;
   the sleeve partially and perimetrically encompassing the plurality of mounting bases;
   the plurality of mounting bases being laterally mounted within the inner cavity and normal to the sleeve;
   the pole being mounted along a longitudinal axis of each of the plurality of canisters;
   each of the plurality of cells being rotatably mounted along the pole;
   a first set of cells being longitudinally mounted within a corresponding canister, wherein the first set of cells are from the plurality of cells, and the corresponding canister is from the plurality of canisters;
   the locking system being integrated between each of the plurality of cells and the corresponding canister; and
   the plurality of canisters being compactly arranged to form the storage assembly, such that the plurality of canisters are pressed against each other.

14. The storage system of claim 13, comprising:
   wherein the plurality of cells being in a locked configuration:
   each of the plurality of cells being positioned within the sleeve; and
   each of the plurality of cells being pressed on a corresponding base, wherein the corresponding base is from the plurality of mounting bases.

15. The storage system of claim 13, the locking system comprising:
   a surrounding wall;
   the surrounding wall being mounted perimetrically around each of the plurality of mounting bases; and
   the surrounding wall encompassing the second end of each of the plurality of cells.

16. The storage system of claim 13, comprising:
   a first transversal cross section of each of the plurality of cells being hexagonal; and
   a second transversal cross section of each of the plurality of canisters being hexagonal.

17. The system of claim 13, wherein the storage assembly being a honeycomb pattern.

* * * * *